(12) United States Patent
Reddy et al.

(10) Patent No.: US 8,488,665 B2
(45) Date of Patent: Jul. 16, 2013

(54) DELTA FRAME BUFFERS

(75) Inventors: Srinivasa Mogathala Prabhakara Reddy, Bangalore (IN); Sandeep Bhatia, Bangalore (IN); Srilakshmi Dorarajulu, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 3437 days.

(21) Appl. No.: 10/606,216

(22) Filed: Jun. 25, 2003

(65) Prior Publication Data

US 2004/0264569 A1    Dec. 30, 2004

(51) Int. Cl.
*H04N 7/12* (2006.01)
(52) U.S. Cl.
USPC ................................................ 375/240.01
(58) Field of Classification Search
USPC ............... 375/240, 240.01, 240.12, 240.2, 375/240.25; 348/616; 382/233
See application file for complete search history.

(56) References Cited

U.S. PATENT DOCUMENTS

| | | | | |
|---|---|---|---|---|
| 5,247,363 | A | * | 9/1993 | Sun et al. .................... 348/616 |
| 5,903,311 | A | * | 5/1999 | Ozcelik et al. ............. 375/240.2 |
| 6,130,963 | A | * | 10/2000 | Uz et al. ...................... 382/233 |
| 6,298,087 | B1 | * | 10/2001 | Luna et al. ............... 375/240.25 |

* cited by examiner

*Primary Examiner* — Allen Wong
(74) *Attorney, Agent, or Firm* — Thomas|Horstemeyer, LLP

(57) ABSTRACT

Presented herein is a system and method for reducing the total size of the frame buffer portion of a decoding circuit. The reduction in size is possible because first portions of B-pictures are displayed while second portions occurring later in the raster order are decoded. The foregoing allows the second portions occurring later in the raster order to overwrite third portions of the picture that have already been displayed. As a result, the frame buffer for providing the frame from a decoder to the display engine need only store the portion that is being displayed and the portion that is being decoded.

14 Claims, 4 Drawing Sheets

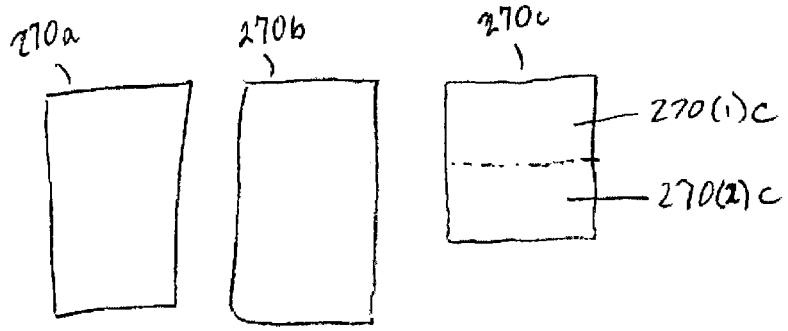
FIGURE 3
FIGURE 4A
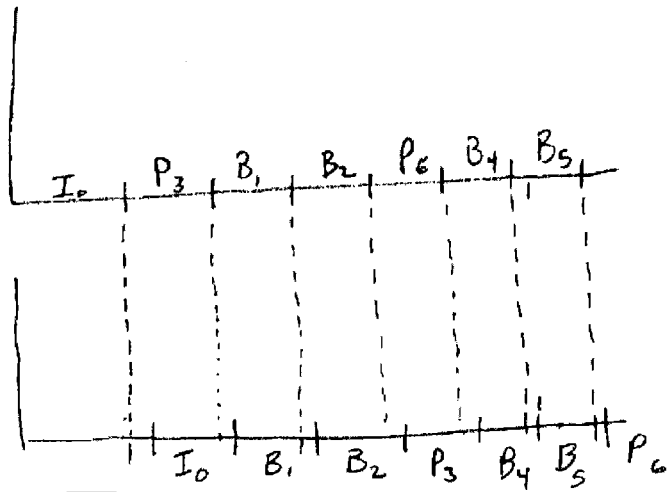
FIGURE 4B
FIGURE 5A
FIG. 5B

US 8,488,665 B2

DELTA FRAME BUFFERS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Standards developed by the Motion Picture Experts' Group (MPEG), such as MPEG-2, provide techniques of compressing digital video for storage and transmission. The MPEG-2 standard uses techniques that take advantage of both spatial and temporal redundancies in video frames to reduce the amount of memory and bandwidth required to store and transmit the video frames.

Spatial compression relies on similarities between adjacent pixels in plain areas of a picture and on dominant spatial frequencies in areas of patterning. Temporal redundancies are exploited by interceding or transmitting only the differences between pictures. The MPEG-2 standard uses three different types of pictures. I-pictures are intra-coded pictures hat need no additional information for decoding. P-pictures are forward predicted from an earlier picture, which can be either an I-picture, or another P-picture. B-pictures are bidirectionally predicted from earlier and/or later I or P-pictures.

The use of B-pictures present unique challenges for decoding pictures. B-pictures are data dependent on both past prediction pictures and future prediction pictures. As a result, the future prediction picture are required to be decoded prior to decoding the B-pictures. However, the B-pictures are displayed prior to the future prediction picture.

The foregoing is resolved by the use of frame buffers. The frame buffers store decoded pictures. Typically, three frame buffers are used for decoding and displaying the pictures. One of the frame buffers stores the decoded past prediction picture, and another one of the frame buffers stores the decoded future prediction picture. The third frame buffer is used to decode B-pictures. Data dependent pictures use the decoded past prediction picture and/or the future prediction picture for decoding.

The pictures stored in the frame buffers are displayed according to the presentation order. The B-pictures is displayed almost immediately after the B-picture is decoded and written to the frame buffer. The I-pictures and P-pictures are usually displayed after a time delay determined by the number of pictures that are data dependent on the I-pictures and P-pictures.

Standard Definition Television (SDTV) is a television standard for providing digital video. A typical SDTV frame has a 720×480 resolution. In the 4:2:0 type picture, there are one set of color pixels (Cr and Cb) for every four luminance pixels. The luminance pixels and each color pixel comprise one byte of data. Accordingly, 518,400 bytes are required to store an SDTV frame with 720×480 resolution. Approximately 1.55 MB are required to store three SDTV frames. High Definition Television (HDTV) is a scheme for providing high resolution video. One HDTV standard defines approximately frames with 1280×720 resolution. Such frames comprise 1.382 MB of data. Three such frames comprise approximately 4.146 MB of data. Another HDTV standard defines frames with 1920×1088 resolution. Such frames comprise approximately 3.133 MB of data. Three such frames comprise 9.4 MB of data.

Typical MPEG decoding circuits are implemented as a board level product with a combination of processors, firmware, dedicated hardware, and memory. The frame buffers are usually implemented in an off-the-shelf SD-RAM memory module or chip. Off-the-shelf SD-RAM memory modules or chips are sold in standard sizes which are typically in exponential powers of two, such as 1, 2, 4, 8, 16, 32, 64 MB, etc.

As noted above, three SDTV frames comprise 1.57 MB of data. A 2 MB chip is generally used for implementing the SDTV frame buffers. Also noted above, three 1280×720 HDTV frames comprise 4.146 MB of data. Generally, an 8 MB chip is used for implementing the 1280×720 HDTV frames. Also noted above, three 1920×1088 HDTV frames comprise approximately 9.4 MB of data. Generally, a 16 MB chip is used for implementing the 1920×1088 HDTV frame buffers.

The foregoing results in considerable memory wastage and also increases costs. Another approach is to place two frames on one chip, and a third frame on a smaller chip. The foregoing reduces memory wastage. However, the reduced memory wastage is offset by increased design complexity and the increased real estate requirements of fusing an additional chip. Furthermore, memory wastage is still considerable.

Further limitations and disadvantages of conventional and traditional approaches will become apparent to one of skill in the art, through comparison of such systems with embodiments of the present invention as set forth in the remainder of the present application.

BRIEF SUMMARY OF THE INVENTION

A system, method, and apparatus for displaying frames is presented herein. In one embodiment, there is presented a method for displaying frames. The method includes displaying a first portion of a frame and writing a second portion of the frame while displaying the first portion of the frame.

In another embodiment, there is presented a circuit for displaying frames. The circuit includes a memory, a display engine, and a controller. The memory stores a first portion of a frame. The display engine displays the first portion of the frame. The controller writes a second portion of the frame in the memory, while the display engine displays the first portion.

In another embodiment, there is presented an integrated circuit for storing decoded frames. The integrated circuit includes a first prediction frame buffer, a second prediction frame buffer, and a delta frame buffer. The first prediction frame buffer stores a first frame. The second prediction frame buffer stores a second frame. The delta frame buffer for stores a portion of a third frame.

These and other advantages and novel features of the embodiments in the present application will be more fully understood from the following description and drawings.

BRIEF DESCRIPTION OF SEVERAL VIEWS OF THE DRAWINGS

FIG. 3 is a block diagram of exemplary frame buffers in accordance with an embodiment of the present invention;

FIG. 4A is a timing diagram describing the decoding times of an exemplary set of pictures;

FIG. 4B is a timing diagram describing the display time of the set of pictures in accordance with an embodiment of the present invention;

FIG. 5A is a block diagram of an exemplary progressive HDTV frame;

FIG. 5B is a block diagram of an exemplary interlaced HDTV frame; and

DETAILED DESCRIPTION OF THE INVENTION

Figure 1A:
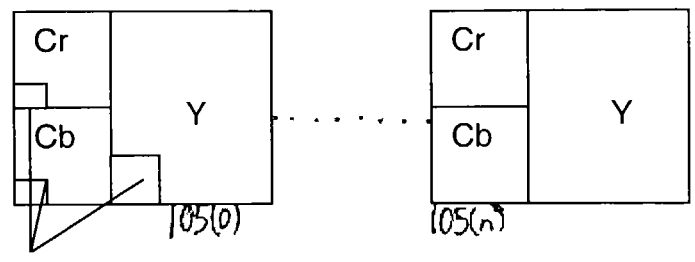
FIG. 1A is a block diagram of video data encoded in accordance with the MPEG-2 standard.

Referring now to FIG. 1A, there is illustrated a block diagram of video data encoded in accordance with the MPEG-2 standard. The video data comprises a series of frames 105. The frames 105 comprise any number of rows of luminence pixels Y, red color pixels Cr, and blue color pixels Cb, wherein each pixel stores a one byte value. In general, the number of rows in the frame 105 are defined according to a predetermined standard. Exemplary standards can include, for example, HDTV, SDTV, NTSC, or PAL.

For example, the Standard Definition Television (SDTV) is a television standard for providing digital video. A typical SDTV frame has a 720×480 resolution. In the 4:2:0 type picture, there are one set of color pixels (Cr and Cb) for every four luminance pixels. Accordingly, each frame 105 comprises a 720×480 array of luminance pixels Y, a 360×240 array of red color pixels Cr, and a 360×240 array of blue color pixels Cb. Accordingly, a 720×480 SDTV frame comprises 518,400 bytes of data.

High Definition Television (HDTV) is a scheme for providing high resolution video. One HDTV standard defines frames with 1280×720 resolution. Such frames comprise a 1280×720 array of luminance pixels Y, a 640×360 array of red color pixels Cr, a 640×360 array of blue color pixels Cb, or approximately 1.382 MB of data. Another HDTV standard defines frames with 1920×1088 resolution. Such frames comprise a 1920×1088 array of luminance pixels Y, a 544×960 array of red color pixels Cr, a 544×960 array of blue color pixels Cb, or approximately 3.13 MB of data.

Video data can typically include up to 30 or more HDTV frames per second. Accordingly, transmission and storage of the video data without compression requires excessive memory and bandwidth. However, the MPEG-2 standard detailed in ITU-T Recommendation H.222.0 (1995)| ISO/IEC 13818-1:1996, In formation Technology—Generic Coding of Moving Pictures and Associated Audio Information Systems, incorporated herein by reference, significantly reduces the amount of memory and bandwidth required to store and transmit video data.

Pursuant to MPEG-2, the frames 105(1) . . . 105(n) are encoded using algorithms taking advantage of both spatial redundancy and/or temporal redundancy. Temporal encoding takes advantage of redundancies between successive frames. A frame can be represented by an offset or a difference frame and/or a displacement with respect to another frame. The encoded frames are known as pictures. Pursuant to MPEG-2, the luminance array Y of each frame 105(1) . . . 105(n) is divided into 16×16 pixel sections, while the array of red color pixels Cr and the array of blue color pixels Cb are divided into 8×8 pixel sections. Each 16×16 pixel section is associated with an 8×8 pixel section of red color pixels Cr and an 8×8 pixel section of blue color pixels Cb, forming a macroblock 108. A picture comprises the macroblocks 108 representing the pixel sections forming the frame 105.

Figure 1B:
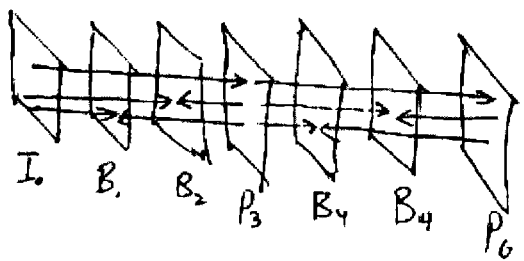
FIG. 1B is an exemplary block diagram of pictures.

Referring now to FIG. 1B, there is illustrated an exemplary block diagram of pictures $I_0$, $B_1$, $B_2$, $P_3$, $B_4$, $B_5$, and $P_6$. The data dependence of each picture is illustrated by the arrows. For example, picture $B_2$ is dependent on reference pictures $I_0$, and $P_3$. Pictures coded using temporal redundancy with respect to either exclusively earlier or later pictures of the video sequence are known as predicted pictures (or P-pictures), for example picture $P_3$. Pictures coded using temporal redundancy with respect to earlier and later pictures of the video sequence are known as bi-directional pictures (or B-pictures), for example, pictures $B_1$, $B_2$. Pictures not coded using temporal redundancy are known as I-pictures, for example $I_0$. In MPEG-2, I and P-pictures are reference pictures.

Figure 1C:
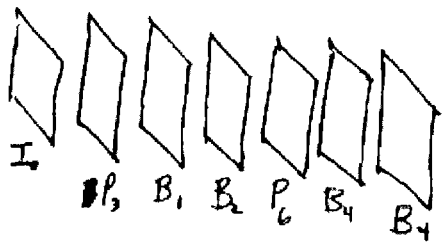
FIG. 1C is a block diagram of pictures in decode order.

The foregoing data dependency among the pictures requires decoding of certain pictures prior to others. Additionally, the use of later pictures as reference pictures for previous pictures, requires that the later picture is decoded prior to the previous picture. As a result, the pictures cannot be decoded in temporal order. Accordingly, the pictures are transmitted in data dependent order. Referring now to FIG. 1C, there is illustrated a block diagram of the pictures in data dependent order.

Figure 1D:
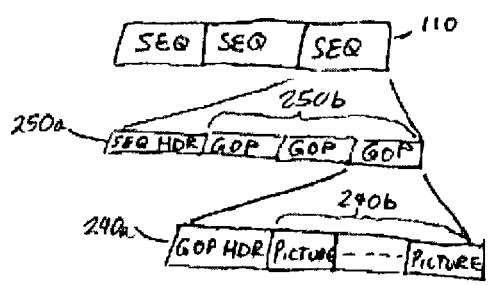
FIG. 1D is a block diagram of the MPEG hierarchy

The pictures are further divided into groups known as groups of pictures (GOP). Referring now to FIG. 1D, there is illustrated a block diagram of the MPEG hierarchy. The pictures of a GOP are encoded together in a data structure comprising a picture parameter set, which indicates the beginning of a GOP, 240a and a GOP Payload 240b. The GOP Payload 240b stores each of the pictures in the GOP in data dependent order. GOPs are further grouped together to form a video sequence 250. The video data 100 is represented by the video sequence 250.

The video sequence 250 can be transmitted to a receiver for decoding and presentation. The data compression achieved allows for transport of the video sequence 250 over conventional communication channels such as cable, satellite, or the internet. Transmission of the video sequence 250 involves packetization and multiplexing layers, resulting in a transport stream, for transport over the communication channel.

Figure 2:
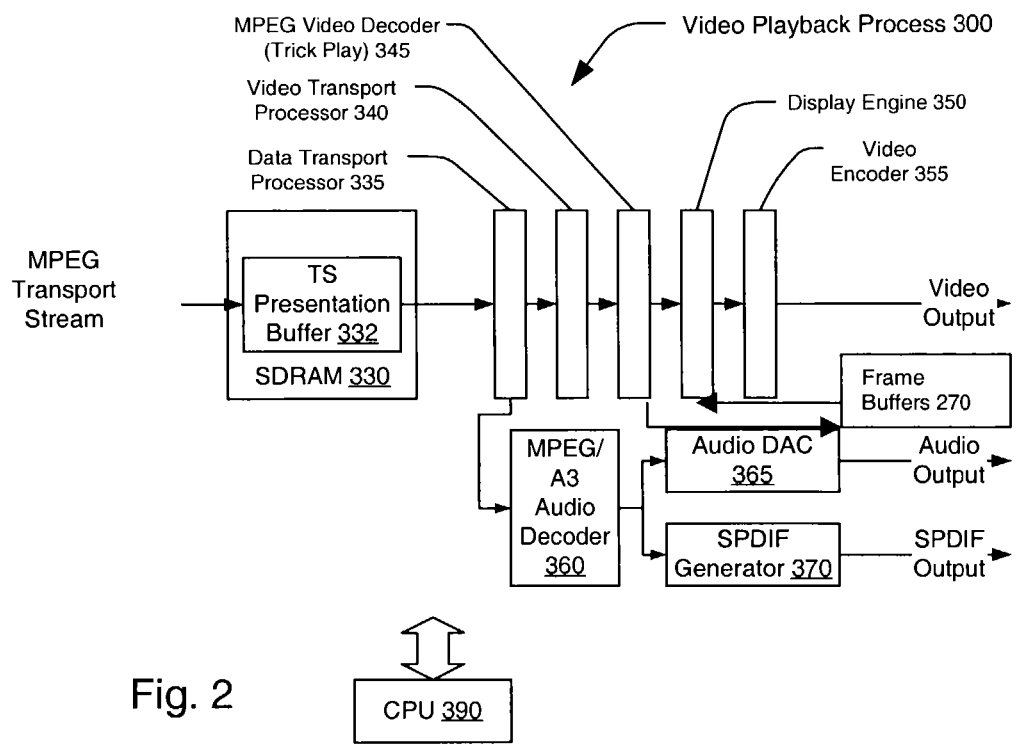
FIG. 2 is a block diagram of an exemplary circuit for decoding and presenting MPEG-2 encoded video data.

Referring now to FIG. 2, there is illustrated a block diagram of an exemplary circuit for decoding the compressed video data described in FIG. 1, in accordance with an embodiment of the present invention. Data is received and stored in a presentation buffer 332 within SDRAM 330. The data can be received from either a communication channel or from a local memory, such as a hard disc or a DVD.

The data output from the presentation buffer 332 is then passed to a data transport processor 335. The data transport processor 335 demultiplexes the transport stream into packetized elementary stream constituents, and passes the audio transport stream to an audio decoder 360 and the video transport stream to a video transport decoder 340 and then to a MPEG video decoder 345. The audio data is then sent to the output blocks, and the video is sent to a display engine 350.

The display engine 350 scales the video picture, renders the graphics, and constructs the complete display. Once the display is ready to be presented, it is passed to a video encoder 355 where it is converted to analog video using an internal digital to analog converter (DAC). The digital audio is converted to analog in an audio digital to analog (DAC) 365.

The decoder 345 decodes at least one picture, $I_0$, $B_1$, $B_2$, $P_3$, $B_4$, $B_5$, $P_6$, ..., during each frame display period. Due to the presence of the B-pictures, $B_1$, $B_2$, the decoder 345 decodes the pictures, $I_0$, $B_1$, $B_2$, $P_3$, $B_4$, $B_5$, $P_6$, ..., in an order that is different from the display order. The decoder 345 decodes each of the reference pictures, e.g., $I_0$, $P_3$, prior to each picture that is predicted from the reference picture. For example, the decoder 345 decodes $I_0$, $B_1$, $B_2$, $P_3$, in the order, $I_0$, $P_3$, $B_1$, and $B_2$. After decoding $I_0$ and $P_3$, the decoder 345 applies the offsets and displacements stored in $B_1$, and $B_2$, to decoded $I_0$ and $P_3$, to decode $B_1$ and $B_2$. In order to apply the offset contained in $B_1$ and $B_2$, to decoded $I_0$ and $P_3$, the decoder 345 stores decoded $I_0$ and $P_3$ in memory known as frame buffers 370.

Referring now to FIG. 3, there is illustrated a block diagram of exemplary frame buffers 270 in accordance with an embodiment of the present invention. The frame buffers 270 comprise two prediction frame buffers 270a, 270b, and a delta buffer 270c. The prediction frame buffers 270a, 270b comprise enough memory for storing a single decoded picture/frame.

In the case where the frames comprise 1920×1088 HDTV frames 105, the prediction frame buffers 270a, 270b comprise 3.13 MB of memory, for example. The delta buffer 270c comprises a proportion of the memory required to store a decoded picture/frame. For example, in the case where the frames 105 comprise 1920×1088 HDTV frames 105, the delta buffer 270c comprises a proportion of 3.13 MB. In an exemplary case, the delta buffer 270c comprises half the memory required to store a decoded picture/frame. In the case where the frame 105 comprises 1920×1088 HDTV frames 105, the delta buffer 270c comprises 1.57 MB, for example. Due to the smaller size of the delta buffer 270c as compared to the prediction frame buffers 270a, 270b, the frame buffers 270 can be implemented on an 8 MB DRAM or SDRAM memory module.

Copy for 1280×720, 1.382 Frame 0.691 MB.

In the case where the frames comprise 1280×720 HDTV frames 105, the prediction frame buffers 270a, 270b comprise 1.382 MB of memory, for example. The delta buffer 270c comprises a proportion of the memory required to store a decoded picture/frame. For example, in the case where the frames 105 comprise 1280×720 HDTV frames 105, the delta buffer 270c comprises a proportion of 1.382 MB. In an exemplary case, the delta buffer 270c comprises half the memory required to store a decoded picture/frame. In the case where the frame 105 comprises 1280×720 HDTV frames 105, the delta buffer 270c comprises 0.691 MB, for example. Due to the smaller size of the delta buffer 270c as compared to the prediction frame buffers 270a, 270b, the frame buffers 270 can be implemented on a 4 MB DRAM or SDRAM memory module.

The delta buffer 270c comprises two regions 270(1)c, and 270(2)c. As will be explained below, while a portion of a frame 105 is written to region 270(2)c by the decoder 245, another portion of the frame 105 can be read from region 270(1)c, and vice versa. Accordingly, the delta buffer 270c provides decoded B-pictures from the decoder 245 to the display engine 250, while including less memory than required to store a decoded frame 105.

Referring now to FIG. 4, there is illustrated a timing diagram describing the decoding and presentation of frames in accordance with an embodiment of the present invention. FIG. 4A describes the decoding times of the pictures, $I_0$, $B_1$, $B_2$, $P_3$, $B_4$, $B_5$, $P_6$. One picture is decoded at each frame display period, although decoding the picture may require substantially less time than one frame display period. As is noted above, wherein the pictures comprise B-pictures, the decoding order is different from the presentation order. In the present exemplary case, the decoding order for pictures $I_0$, $B_1$, $B_2$, $P_3$, $B_4$, $B_5$, $P_6$ is $I_0$, $P_3$, $B_1$, $B_2$, $P_6$, $B_4$, $B_5$. The decoded pictures $I_0$, $P_3$ are needed to decode pictures $B_1$, $B_2$. Therefore, the decoder 245 decodes I0 and P3, the decoder 245 writes $I_0$ and $P_3$ into the prediction frame buffers 270a and 270b. When decoding pictures $B_1$, and $B_2$, the decoder 245 refers to the prediction frame buffers 270a, 270b storing $I_0$ and $P_3$.

FIG. 4B illustrates the presentation times of the pictures, $I_0$, $B_1$, $B_2$, $P_3$, $B_4$, $B_5$, $P_6$. in accordance with an embodiment of the present invention. As can be seen, there is a delay between presentation time and decode time. The delay between presentation time and the decode time includes two components—a decoding lag, and a reference delay. The decoding lag is based on an inherent delay required for decoding at least a portion of the picture prior to presentation time. The reference delay is due to the number of past bi-directional pictures which are predicted from the frames. For example, the presentation of picture $P_3$ is delayed for two frame periods for decoding past pictures $B_1$, $B_2$.

In MPEG-2, B-pictures are not used for prediction of any other pictures. Accordingly, B-pictures are not associated with any reference delay. Therefore, B-pictures can be displayed immediately after decoding. Furthermore, it is noted that the display engine 250 scans the picture in raster order. In raster order, the top lines are displayed first and the bottom lines are displayed last for progressive displays. For interlaced displays, the odd number lines are displayed first followed by the even numbered lines. Therefore, the B-picture can be provided to the display engine 250 in portions. The foregoing reduces the decoding delay. The foregoing also allows for a reduction in the size of the delta frame buffer 270c for storing a B-frame, as compared to the prediction frame buffers 270a, 270b.

Referring now to FIG. 5A, there is illustrated a block diagram of an exemplary decoded progressive frame 105. The progressive frame 105 comprises an n×m array of luminance pixels Y, an n/2×m/2 array of red color pixels Cr, and an n/2×m/2 array of blue color pixels Cb. Pursuant to the MPEG-2 specification, the array of luminance pixels Y is divided into 16×16 arrays. Each 16×16 array of luminance pixels is associated with an 8×8 array of red color pixels Cr, and an 8×8 array of blue color pixels. The 16×16 array of luminance pixels, and the 8×8 arrays of color pixels, Cr, and Cb are collectively known as macroblocks 128. Accordingly, an n×m progressive frame 105 is represented by n/16×m/16 macroblocks 108.

The display engine 250 sequentially displays the rows of pixels of the progressive frame 105 starting from the top row and moving down to the bottom row. One frame period comprises the time period beginning at the time the top row is displayed and terminating at the time the bottom row is displayed for a progressive frame.

For frames 105 decoded from I-pictures or P-pictures, the decoder 245 decodes the entire frame 105 prior to presentation of any portion of the frame 105. However, for B-pictures, the display engine 250 displays a portion of the frame 105, while the decoder 245 decodes another portion of the frame 105 that is later in the raster order.

Additionally, the decoder 245 can overwrite a previously displayed portion of the frame 105 in the delta buffer 270c. For example, the frame 105 can be divided into portions 105a, 105b, 105c, and 105d. After the decoder 245 decodes portion 105a and writes portion 105a into the top region of 270(1)c, the display engine 250 displays portion 105a.

While the display engine 250 displays portion 105a, the decoder can decode portion 105b and write portion 105b to bottom region 270(2)c. After the display engine 250 displays portion 105a from region 270(1)c, the display engine 250 displays portion 105b from region 270(2)c. While the display engine 250 displays portion 105b from region 270(2)c, the decoder 245 can decode portion 105c and overwrite portion 105a in region 270(1)c. After the decoder 245 decodes portion 105c and writes portion 105c into the top region of 270(1)c, the display engine 250 displays portion 105c. While the display engine 250 displays portion 105c, the decoder can decode portion 105d and overwrite portion 105b in region 270(2)c. After the display engine 250 displays portion 105c from region 270(1)c, the display engine 250 displays portion 105d from region 270(2)c.

For a progressive frame 105, the portions 105a, 105b, 105c, and 105d can include, for example, the first n/64 rows of macroblocks 108, the second n/64 rows of macroblocks, the third n/64 rows of macroblocks, and all of the macroblocks after the third n/64 rows of macroblocks, respectively.

Referring now to FIG. 5B, there is illustrated an exemplary interlaced frame 105. The interlaced frame 105 comprises a top field 105(0) and a bottom field 105(1). For an interlaced frame 105, the raster order starts with even numbered lines from top to bottom, followed by odd numbered lines from top to bottom. The top field 105(0) corresponds to the even numbered lines, while the bottom field 105(1) corresponds to the odd numbered lines.

The top field 105(0) and bottom field 105(1) each comprise an n/2×m array of luminance pixels Y, an n/4×m/2 array of red color pixels Cr, and an n/4×m/2 array of blue color pixels Cb. Additionally, pursuant to the MPEG-2 standard, the arrays of luminance pixels Y are divided into 16×16 arrays of luminance pixels, and the red and blue color pixels are divided into 8×8 arrays. Each 16×16 array of luminance pixels is associated with an 8×8 array of red color pixels and blue color pixels, forming an macroblock 108. Accordingly, the top field 105(0) and the bottom field 105(1) comprise n/32×m/16 macroblocks 108.

In the case of an interlaced frame, the first portion 105a can comprise the first n/64 rows of macroblocks 108 in the top field 105(0). The second portion 105b can comprises the remaining macroblocks 108 of the top field 105(0). The third portion 105c can comprise the first n/64 rows of macroblocks 108 in the bottom field 105(1). The fourth portion 105b can comprises the remaining macroblocks 108 of the bottom field 105(0).

Figure 6:
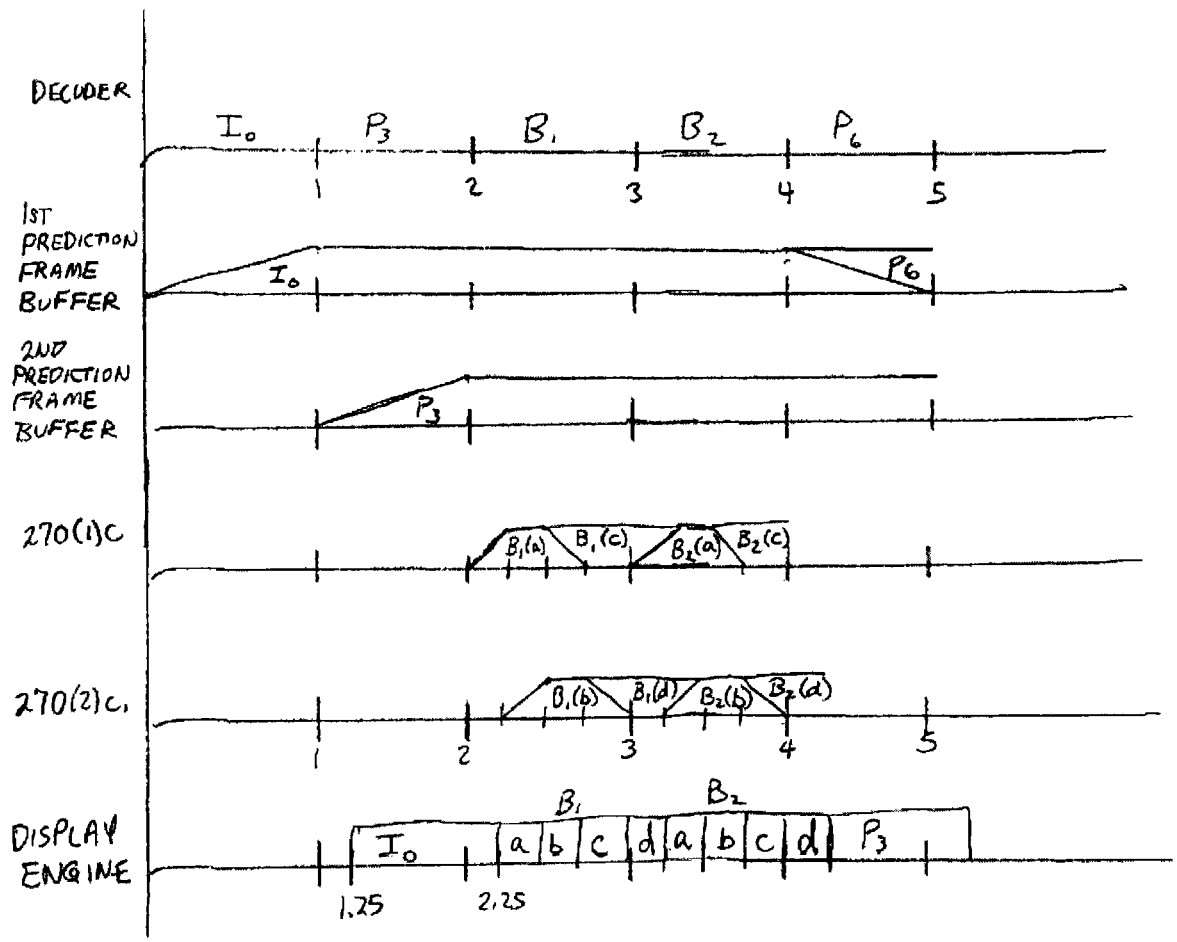
FIG. 6 is a timing diagram describing the contents of the frame buffers in accordance with an embodiment of the present invention.

Referring now to FIG. 6, there is illustrated a timing diagram describing the contents of the frame buffers during the decoding and display of the pictures $I_0$, $B_1$, $B_2$, $P_3$, in accordance with an embodiment of the present invention. The decoding and display of the pictures will be described with reference to FIG. 2. Although the decoding and display of the picture sequence $I_0$, $B_1$, $B_2$, $P_3$, is illustrated, other picture sequences are possible. In general, the decoder 245 decodes one picture during each frame period, although the decoder 245 may finish decoding the picture long before the end of the frame period. Additionally, the decoding times for pictures vary, with I-pictures taking the longest time, and B-pictures taking the shortest time. Statistically, it has been observed that I-picture require four times the processing for decoding as compared to B-pictures.

At t=0, 1 the decoder 245 decodes and write $I_0$ and $P_3$, in prediction frame buffers 270a, 270b, respectively. At t=1.25 to 2.25, the display engine 250 displays $I_0$. At t=2.00 to 2.25, the decoder 245 decodes and stores first portion 105a of decoded picture $B_1$ in the top region of delta buffer 270(1)c.

At t=2.25 to 2.50, the decoder 245 decodes and stores the second portion 105b of decoded picture $B_1$, in the bottom region of delta buffer 270(2)c, while the display engine 250 displays the first portion 105a of decoded picture $B_1$ in the top region of delta buffer 270(1)c.

At t=2.50 to 2.75, the decoder 245 decodes and stores the third portion 105c of decoded picture $B_1$, in the top region of delta buffer 270(1)c (overwriting the first portion 105a of $B_1$), while the display engine 250 displays the second portion 105b of decoded picture $B_1$ in the bottom region of delta buffer 270(2)c.

At t=2.75 to 3.00, the decoder 245 decodes (from $I_0$ and $P_3$ stored in prediction buffers 270a, 270b) and stores the fourth portion 105d of decoded picture $B_1$ in the bottom region of delta buffer 270(2)c (overwriting the second portion 105b of $B_1$), while the display engine 250 displays the third portion 105c of decoded picture $B_1$ in the top region of delta buffer 270(1)c.

At t=3.00 to 3.25, the decoder 245 decodes (from $I_0$ and $P_3$ stored in prediction buffers 270a, 270b) and stores the first portion 105a of decoded picture $B_2$ in the top region of delta buffer 270(1)c, (overwriting the third portion 105a of $B_1$), while the display engine 250 displays the fourth portion 105d of decoded picture $B_1$ in the bottom region of delta buffer 270(2)c.

At t=3.25 to 3.5, the decoder 245 decodes (from $I_0$ and $P_3$ stored in prediction buffers 270a, 270b) and stores the second portion 105a of decoded picture $B_2$ in the bottom region of delta buffer 270(2)c, (overwriting the fourth portion 105d of $B_1$), while the display engine 250 displays the first portion 105a of decoded picture $B_2$ in the top region of delta buffer 270(1)c.

At t=3.50 to 3.75, the decoder 245 decodes (from $I_0$ and $P_3$ stored in prediction buffers 270a, 270b) and stores the third portion 105c of decoded picture $B_2$ in the top region of delta buffer 270(1)c (overwriting the first portion 105a of $B_2$), while the display engine 250 displays the second portion 105b of decoded picture $B_2$ in the bottom region of delta buffer 270(2)c.

At t=3.75 to 4.00, the decoder 245 decodes (from $I_0$ and $P_3$ stored in prediction buffers 270a, 270b) and stores the fourth portion 105d of decoded picture $B_2$ in the bottom region of delta buffer 270(2)c (overwriting the second portion 105b of $B_2$), while the display engine 250 displays the third portion 105c of decoded picture $B_2$ in the top region of delta buffer 270(1)c.

At t=4.00 to 5.00, the decoder 245 decodes and stores picture $P_6$ in prediction buffer 270a (overwriting $I_0$). From t=4.00 to 4.25, the display engine 250 displays the last portion of 105d of decoded picture $B_2$ in the bottom region of the delay buffer 270(2)c.

The foregoing allows for reducing the total size of the frame buffer portion of a decoding circuit. The reduction in size is possible because first portions of B-pictures are displayed while second portions occurring later in the raster order are decoded. The foregoing allows the second portions occurring later in the raster order to overwrite the portions of the picture that have already been displayed. As a result, the frame buffer for providing the frame from a decoder to the display engine need only store the portion that is being displayed and the portion that is being decoded. However, in some embodiments, additional regions may be added and the regions can be written to or read in a round-robin fashion.

As a result of the reduction in the total size of the frame buffers 270, the requisite frame buffers 270 for decoding MPEG-2 encoded 720×480 SDTV frames can be implemented on a 2 MB memory module. The requisite frame buffers 270 for decoding MPEG-2 encoded 1280×720 HDTV frames can be implemented on a 4 MB memory module. The requisite frame buffers 270 for decoding MPEG-2 encoded 1920×1088 HDTV frames can be implemented on an 8 MB memory module.

One embodiment of the present invention may be implemented as a board level product, as a single chip, application specific integrated circuit (ASIC), or with varying levels integrated on a single chip with other portions of the system as separate components, such as the frame buffers 270 implemented on an appropriate size memory module. The degree of integration of the monitoring system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for displaying progressive frames, said method comprising:
   displaying a first portion of a progressive frame; and
   writing a second portion of the progressive frame while displaying the first portion of the progressive frame.

2. The method of claim 1, wherein writing the second portion of the progressive frame further comprises:
   overwriting a third portion of the progressive frame with the second portion of the progressive frame.

3. The method of claim 1, wherein writing the second portion of the progressive frame further comprises:
   decoding the second portion of the progressive frame.

4. The method of claim 1, further comprising:
   displaying the second portion of the progressive frame responsive to displaying the first portion of the progressive frame; and
   overwriting the first portion of the progressive frame with a fourth portion of the progressive frame.

5. The method of claim 1, further comprising:
   displaying the second portion of the progressive frame responsive to displaying the first portion of the progressive frame; and
   overwriting the first portion of the progressive frame with a first portion of another progressive frame while displaying the second portion of the progressive frame.

6. The method of claim 1, wherein the progressive frame comprises a high definition television progressive frame.

7. A circuit for displaying progressive frames, said circuit comprising:
   a memory for storing a first portion of a progressive frame;
   a display engine for displaying the first portion of the progressive frame; and
   a controller for writing a second portion of the progressive frame in the memory, while the display engine displays the first portion of the progressive frame.

8. The circuit of claim 7, wherein the controller overwrites a third portion of the progressive frame with the second portion of the progressive frame in the memory.

9. The circuit of claim 7, wherein the controller decodes the second portion of the progressive frame.

10. The circuit of claim 7, wherein:
    the display engine displays the second portion of the progressive frame responsive to displaying the first portion of the progressive frame; and
    the controller overwrites the first portion of the progressive frame with a fourth portion of the progressive frame in the memory.

11. The circuit of claim 7, wherein:
    the display engine displays the second portion of the progressive frame responsive to displaying the first portion of the progressive frame; and
    the controller overwrites the first portion of the progressive frame with a first portion of another progressive frame while the display engine displays the second portion of the progressive frame.

12. The circuit of claim 7, wherein the memory further comprises:
    a first prediction frame buffer for storing a first prediction frame;
    a second prediction frame buffer for storing a second prediction frame; and
    a delta frame buffer for storing the first portion of the progressive frame and the second portion of the progressive frame.

13. The circuit of claim 12, wherein the memory comprises no more than 4 megabytes, and
    wherein the progressive frame and the first prediction frame and the second prediction frame comprise high definition television progressive frames with at least 1280×720 resolution.

14. The circuit of claim 13, wherein the memory comprises no more than 8 megabytes, and
    wherein the progressive frame and the first prediction frame and the second prediction frame comprise high definition television progressive frames with at least 1920×1080 resolution.

* * * * *